(12) United States Patent
Wang et al.

(10) Patent No.: US 11,886,266 B2
(45) Date of Patent: Jan. 30, 2024

(54) DYNAMIC POWER CONTROL

(71) Applicant: Micron Technology, Inc., Boise, ID (US)

(72) Inventors: Junjun Wang, Shanghai (CN); Yanming Liu, Shanghai (CN); Deping He, Boise, ID (US); Hua Tan, Shanghai (CN)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/736,886

(22) Filed: May 4, 2022

(65) Prior Publication Data

US 2022/0397953 A1 Dec. 15, 2022

Related U.S. Application Data

(60) Provisional application No. 63/208,875, filed on Jun. 9, 2021.

(51) Int. Cl.
| | |
|---|---|
| *G06F 1/00* | (2006.01) |
| *G06F 1/3225* | (2019.01) |
| *G06F 1/3296* | (2019.01) |
| *G06F 3/06* | (2006.01) |
| *G06F 1/3203* | (2019.01) |

(52) U.S. Cl.
CPC .......... *G06F 1/3225* (2013.01); *G06F 1/3296* (2013.01); *G06F 3/0625* (2013.01); *G06F 3/0659* (2013.01); *G06F 1/3203* (2013.01); *G06F 3/0679* (2013.01)

(58) Field of Classification Search
CPC .... G06F 1/3225; G06F 1/3296; G06F 3/0625; G06F 3/0659; G06F 3/0679; G06F 1/3275; Y02D 10/00
USPC ......................................................... 713/300
See application file for complete search history.

(56) References Cited

U.S. PATENT DOCUMENTS

| | | | | |
|---|---|---|---|---|
| 7,505,795 | B1 * | 3/2009 | Lim | H04W 52/0232 455/343.1 |
| 11,644,361 | B2 * | 5/2023 | Howell | G01J 1/44 351/158 |
| 2006/0053315 | A1 * | 3/2006 | Menzl | G11B 19/06 713/300 |
| 2013/0151755 | A1 * | 6/2013 | Elhamias | G06F 3/0679 711/E12.008 |
| 2017/0177226 | A1 * | 6/2017 | Lee | G11C 29/028 |
| 2017/0271020 | A1 * | 9/2017 | Zeng | G11C 16/3495 |
| 2020/0356438 | A1 * | 11/2020 | Kim | G06F 3/0679 |
| 2020/0379861 | A1 * | 12/2020 | Park | G06F 12/0246 |
| 2020/0381036 | A1 * | 12/2020 | Park | G11C 5/144 |

(Continued)

*Primary Examiner* — Volvick Derose
(74) *Attorney, Agent, or Firm* — Holland & Hart LLP

(57) ABSTRACT

Methods, systems, and devices for dynamic power control are described. In some examples, a memory device may be configured to adjust a first duration for transitioning power modes. For example, the memory device may be configured to operate in a first power mode, a second power mode, and a third power mode. When operating in a second power mode, the memory device may be configured to increase or decrease the first duration for transitioning to a third power mode based on a second duration between received commands. If no commands are received during the first duration, the memory device may transition from the second power mode to the third power mode.

25 Claims, 7 Drawing Sheets

(56) References Cited

U.S. PATENT DOCUMENTS

2022/0075438 A1\* 3/2022 Palmer .................. G06F 1/3296
2022/0397953 A1\* 12/2022 Wang .................... G06F 1/3225

\* cited by examiner

DYNAMIC POWER CONTROL

CROSS REFERENCE

The present Application for Patent claims priority to U.S. Provisional Patent Application No. 63/208,875 by Wang et al, entitled "DYNAMIC POWER CONTROL", filed Jun. 9, 2021, which is assigned to the assignee hereof and is expressly incorporated by reference in its entirety herein.

FIELD OF TECHNOLOGY

The following relates generally to one or more systems for memory and more specifically to dynamic power control.

BACKGROUND

Memory devices are widely used to store information in various electronic devices such as computers, user devices, wireless communication devices, cameras, digital displays, and the like. Information is stored by programing memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read, or sense, the state of one or more memory cells within the memory device. To store information, a component may write, or program, one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), 3-dimensional cross-point memory (3D cross point), not-or (NOR) and not-and (NAND) memory devices, and others. Memory devices may be volatile or non-volatile. Volatile memory cells (e.g., DRAM cells) may lose their programmed states over time unless they are periodically refreshed by an external power source. Non-volatile memory cells (e.g., NAND memory cells) may maintain their programmed states for extended periods of time even in the absence of an external power source.

DETAILED DESCRIPTION

Some memory devices may be configured to operate in various power modes. For example, a memory device may be configured to operate in a sleep mode (e.g., a hibernate mode) where the device may turn off power to the array and various circuitry. Moreover, a memory device may also be configured to operate in a "power saving mode" where power may be maintained to some portions of the memory device and not others (e.g., other portions may be powered off). In some instances, the memory device may transition from a normal mode (e.g., an active mode) to the power saving mode if no commands are received for a first duration, and may transition from the power saving mode to the sleep mode if no commands are received for a second duration that is longer than the first duration. However, because it may take the memory device longer to transition from a sleep mode to a normal mode than from a power saving mode to a normal mode, increasing the second duration may result in poor performance (e.g., longer latency) while decreasing the second duration may increase power consumption when the memory device is receiving relatively few commands. Accordingly, a memory device configured to dynamically adjust the first duration and the second duration may be desirable.

A memory device configured to dynamically adjust the duration between entering a power saving mode and transitioning to a sleep mode (e.g., a hibernate mode) is described herein. In some examples, the memory device may be configured to determine a duration between received commands while operating in the power saving mode, which may allow the memory device to lengthen or shorten the duration for transitioning to the sleep mode. For example, the memory device may determine one or more of durations between commands after entering the power saving mode. If the durations exceed a first threshold, then the memory device may shorten the duration (e.g., to a minimum duration) for transitioning to the sleep mode. Moreover, if durations do not exceed a second threshold, then the memory device may lengthen the duration (e.g., to a maximum duration) for transitioning to the sleep mode. By dynamically adjusting the duration for transitioning from a power saving mode to a sleep mode, the memory device may remain in a power saving mode when receiving commands at relatively short intervals, which may reduce the latency that would otherwise be incurred due to the memory device transitioning to the sleep mode. Moreover, the memory device may transition to the sleep mode when receiving commands at relatively long intervals, which may decrease the overall power consumption of the memory device.

Figure 1:
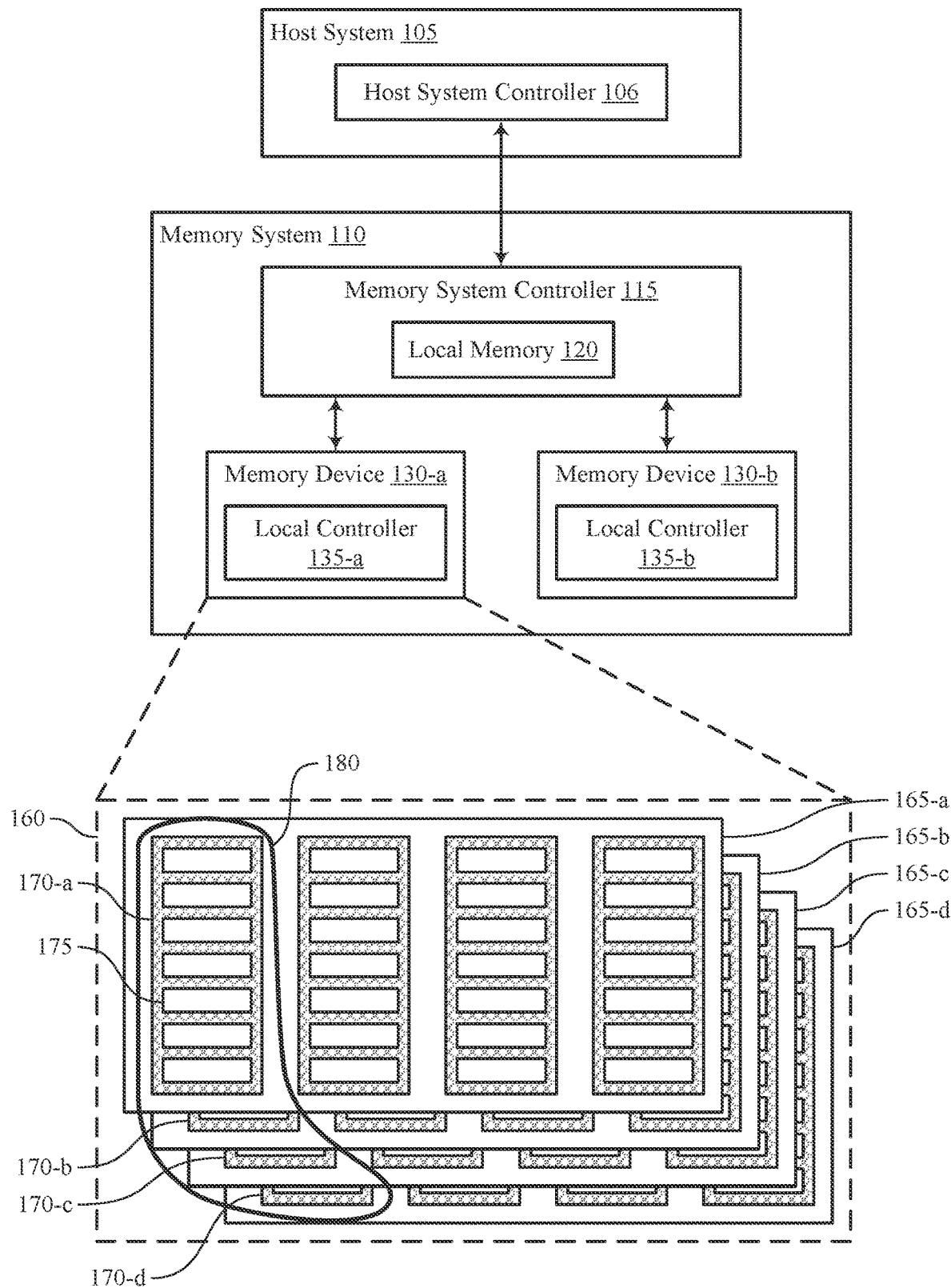
FIG. 1 illustrates an example of a system that supports dynamic power control in accordance with examples as disclosed herein.
Figure 2:
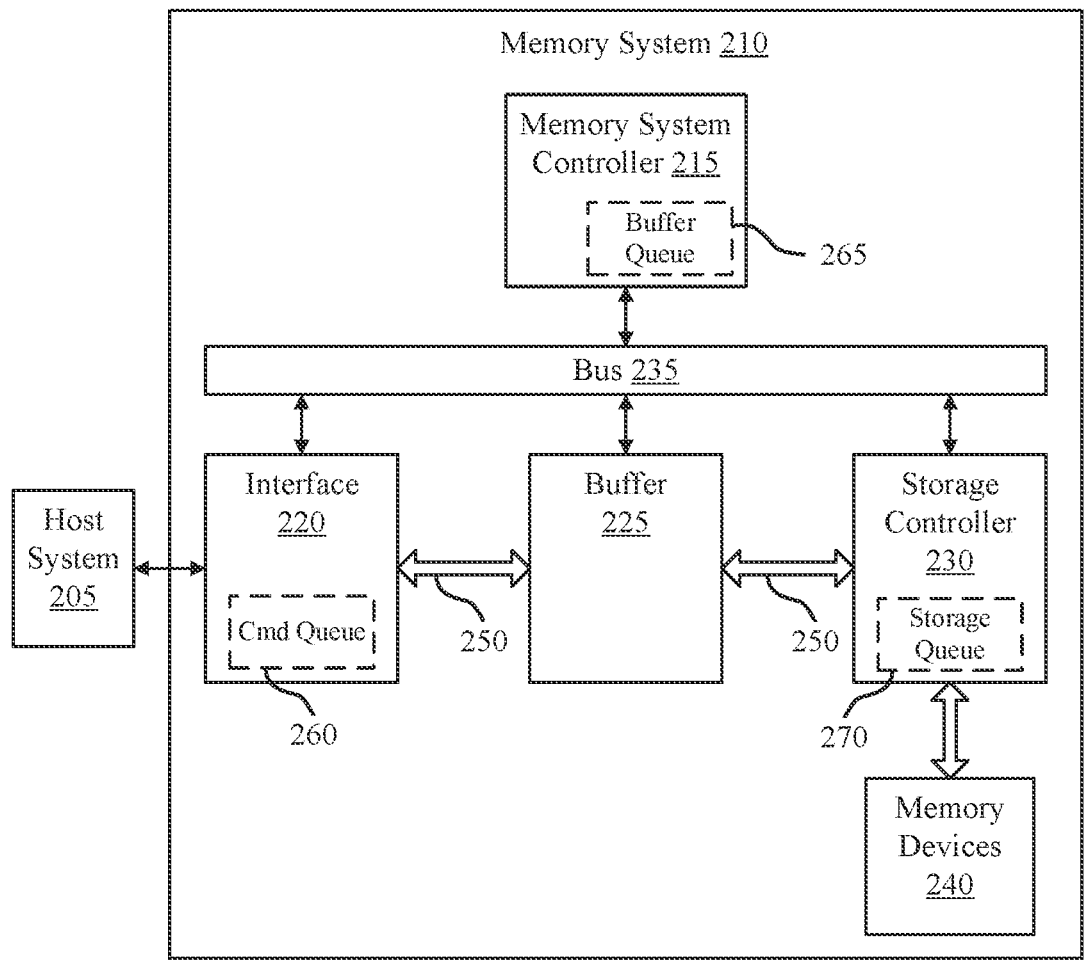
FIG. 2 illustrates an example of a system that supports dynamic power control in accordance with examples as disclosed herein.

Features of the disclosure are initially described in the context of memory systems with reference to FIGS. 1 and 2. Features of the disclosure are described in the context of timing diagrams, block diagrams, and process flow diagrams with reference to FIGS. 3-5B. These and other features of the disclosure are further illustrated by and described in the context of an apparatus diagram and flowchart that relate to dynamic power control with reference to FIGS. 6 and 7.

FIG. 1 illustrates an example of a system 100 that supports dynamic power control in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices, and in some cases may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may in some cases be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-a and 130-b are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hardcoded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally or alternatively include static random access memory (SRAM) or other memory that may be used by the memory system controller 115 for internal storage or calculations, for example, related to the functions ascribed herein to the memory system controller 115.

Although the example of the memory system 110 in FIG. 1 has been illustrated as including the memory system controller 115, in some cases, a memory system 110 may not include a memory system controller 115. For example, the memory system 110 may additionally or alternatively rely upon an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may in some cases instead be performed by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (RAM) (FePAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof. Additionally or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-a may include a local controller 135-a and a memory device 130-b may include a local controller 135-b.

In some cases, a memory device 130 may be or include a NAND device (e.g., NAND flash device). A memory device 130 may be or include a memory die 160. For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may take place within different planes 165. For example, concurrent operations may be performed on memory cells within different blocks 170 so long as the different blocks 170 are in different planes 165. In some cases, an individual block 170 may be referred to as a physical block, and a virtual block 180 may refer to a group of blocks 170 within which concurrent operations may occur. For example, concurrent operations may be performed on blocks 170-a, 170-b, 170-c, and 170-d that are within planes 165-a, 165-b, 165-c, and 165-d, respectively, and blocks 170-a, 170-b, 170-c, and 170-d may be collectively referred to as a virtual block 180. In some cases, a virtual block may include blocks 170 from different memory devices 130 (e.g., including blocks in one or more planes of memory device 130-a and memory device 130-b). In some cases, the blocks 170 within a virtual block may have the same block address within their respective planes 165 (e.g., block 170-a may be "block 0" of plane 165-a, block 170-b may be "block 0" of plane 165-b and so on). In some cases, performing concurrent operations in different planes 165 may be subject to one or more restrictions, such as concurrent operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may in some cases not be updated until the entire block 170 that includes the page 175 has been erased.

The system 100 may include any quantity of non-transitory computer readable media that support dynamic power control. For example, the host system 105, the memory system controller 115, or a memory device 130 may include or otherwise may access one or more non-transitory computer readable media storing instructions (e.g., firmware) for performing the functions ascribed herein to the host system 105, memory system controller 115, or memory device 130. For example, such instructions, if executed by the host system 105 (e.g., by the host system controller 106), by the memory system controller 115, or by a memory device 130 (e.g., by a local controller 135), may cause the host system 105, memory system controller 115, or memory device 130 to perform one or more associated functions as described herein.

In some cases, a memory system 110 may utilize a memory system controller 115 to provide a managed memory system that may include, for example, one or more memory arrays and related circuitry combined with a local (e.g., on-die or in-package) controller (e.g., local controller 135). An example of a managed memory system is a managed NAND (MNAND) system.

In some examples, the memory system 110 may be configured to operate in a power saving mode or a sleep mode (e.g., a hibernate mode). As described herein, the power saving mode may utilize more power than the sleep mode, but the memory system 110 may be able to transition from the power saving mode to a normal mode (e.g., an active mode) faster than from the sleep mode to the active mode. The memory system 110 may set an initial duration (e.g., a first duration, Tpsm) for operating in the power saving mode. Accordingly, when the memory system controller 115 receives a command (e.g., a hibernate command) from the host system 105, or when the memory system controller 115 fails to receive a command for a duration (e.g., when the host system 105 is idle), the memory system 110 may enter the power saving mode.

Upon entering the power saving mode, the memory system controller 115 may determine a duration (e.g., a second duration, Tperiod) between received commands. For example, the memory system controller 115 may receive a first command, may transition to the power saving mode, and may receive a second command. The memory system controller 115 may determine the duration between the first command and the second command, which may be referred to as Tperiod. In some instances, the memory system controller 115 may compare Tperiod to a first threshold (e.g., a low threshold, TH_low) and may increase Tpsm if Tperiod does not satisfy the threshold (e.g., if Tperiod<TH_low). Moreover, the memory system controller 115 may compare Tperiod to a second threshold (e.g., a high threshold, TH_high) and may decrease Tpsm if Tperiod satisfies the threshold (e.g., if Tperiod>TH_high).

Accordingly, if no commands are received within Tpsm, the memory system 110 may transition from the power saving mode to the sleep mode. By increasing Tpsm when the memory system controller 115 is receiving commands from the host system 105 at relatively short intervals, the latency the memory system 110 incurs when transitioning power modes may be improved. That is, because the memory system 110 may transition from a power saving mode to an active mode faster than from a sleep mode to an active mode, latency may be improved by increasing Tpsm under heavy loading conditions. Additionally or alternatively, by decreasing Tpsm when the memory system controller 115 is receiving commands from the host system 105 at relatively long intervals, the memory system 110 may incur additional power savings by transitioning to the sleep mode faster.

FIG. 2 illustrates an example of a system 200 that supports dynamic power control in accordance with examples as disclosed herein. The system 200 may be an example of a system 100 as described with reference to FIG. 1 or aspects thereof. The system 200 may include a memory system 210 configured to store data received from the host system 205 and to send data to the host system 205, if requested by the host system 205 using access commands (e.g., read commands or write commands). The system 200 may implement aspects of the system 100 as described with reference to FIG. 1. For example, the memory system 210 and the host system 205 may be examples of the memory system 110 and the host system 105, respectively.

The memory system 210 may include memory devices 240 to store data transferred between the memory system 210 and the host system 205, e.g., in response to receiving access commands from the host system 205, as described herein. The memory devices 240 may include one or more memory devices as described with reference to FIG. 1. For example, the memory devices 240 may include NAND memory, PCM, self-selecting memory, 3D cross point, other chalcogeni de-based memories, FERAM, MRAM, NOR (e.g., NOR flash) memory, STT-MRAM, CBRAM, RRAM, or OxRAM.

The memory system 210 may include a storage controller 230 for controlling the passing of data directly to and from the memory devices 240, e.g., for storing data, retrieving data, and determining memory locations in which to store data and from which to retrieve data. The storage controller 230 may communicate with memory devices 240 directly or via a bus (not shown) using a protocol specific to each type of memory device 240. In some cases, a single storage controller 230 may be used to control multiple memory devices 240 of the same or different types. In some cases, the memory system 210 may include multiple storage controllers 230, e.g., a different storage controller 230 for each type of memory device 240. In some cases, a storage controller 230 may implement aspects of a local controller 135 as described with reference to FIG. 1.

The memory system 210 may additionally include an interface 220 for communication with the host system 205 and a buffer 225 for temporary storage of data being transferred between the host system 205 and the memory devices 240. The interface 220, buffer 225, and storage controller 230 may be for translating data between the host system 205 and the memory devices 240, e.g., as shown by a data path 250, and may be collectively referred to as data path components.

Using the buffer 225 to temporarily store data during transfers may allow data to be buffered as commands are being processed, thereby reducing latency between commands and allowing arbitrary data sizes associated with commands. This may also allow bursts of commands to be handled, and the buffered data may be stored or transmitted (or both) once a burst has stopped. The buffer 225 may include relatively fast memory (e.g., some types of volatile memory, such as SRAM or DRAM) or hardware accelerators or both to allow fast storage and retrieval of data to and from the buffer 225. The buffer 225 may include data path switching components for bi-directional data transfer between the buffer 225 and other components.

The temporary storage of data within a buffer 225 may refer to the storage of data in the buffer 225 during the execution of access commands. That is, upon completion of an access command, the associated data may no longer be maintained in the buffer 225 (e.g., may be overwritten with data for additional access commands). In addition, the buffer 225 may be a non-cache buffer. That is, data may not be read directly from the buffer 225 by the host system 205. For example, read commands may be added to a queue without an operation to match the address to addresses already in the buffer 225 (e.g., without a cache address match or lookup operation).

The memory system 210 may additionally include a memory system controller 215 for executing the commands received from the host system 205 and controlling the data path components in the moving of the data. The memory system controller 215 may be an example of the memory system controller 115 as described with reference to FIG. 1. A bus 235 may be used to communicate between the system components.

In some cases, one or more queues (e.g., a command queue 260, a buffer queue 265, and a storage queue 270) may be used to control the processing of the access commands and the movement of the corresponding data. This may be beneficial, e.g., if more than one access command from the host system 205 is processed concurrently by the memory system 210. The command queue 260, buffer queue 265, and storage queue 270 are depicted at the interface 220, memory system controller 215, and storage controller 230, respectively, as examples of a possible implementation. However, queues, if used, may be positioned anywhere within the memory system 210.

Data transferred between the host system 205 and the memory devices 240 may take a different path in the memory system 210 than non-data information (e.g., commands, status information). For example, the system components in the memory system 210 may communicate with each other using a bus 235, while the data may use the data path 250 through the data path components instead of the bus 235. The memory system controller 215 may control how and if data is transferred between the host system 205 and the memory devices 240 by communicating with the data path components over the bus 235 (e.g., using a protocol specific to the memory system 210).

If a host system 205 transmits access commands to the memory system 210, the commands may be received by the interface 220, e.g., according to a protocol (e.g., a UFS protocol or an eMMC protocol). Thus, the interface 220 may be considered a front end of the memory system 210. Upon receipt of each access command, the interface 220 may communicate the command to the memory system controller 215, e.g., via the bus 235. In some cases, each command may be added to a command queue 260 by the interface 220 to communicate the command to the memory system controller 215.

The memory system controller 215 may determine that an access command has been received based on the communication from the interface 220. In some cases, the memory system controller 215 may determine the access command has been received by retrieving the command from the command queue 260. The command may be removed from the command queue 260 after it has been retrieved therefrom, e.g., by the memory system controller 215. In some cases, the memory system controller 215 may cause the interface 220, e.g., via the bus 235, to remove the command from the command queue 260.

Upon the determination that an access command has been received, the memory system controller 215 may execute the access command. For a read command, this may mean obtaining data from the memory devices 240 and transmitting the data to the host system 205. For a write command, this may mean receiving data from the host system 205 and moving the data to the memory devices 240.

In either case, the memory system controller 215 may use the buffer 225 for, among other things, temporary storage of the data being received from or sent to the host system 205. The buffer 225 may be considered a middle end of the memory system 210. In some cases, buffer address management (e.g., pointers to address locations in the buffer 225) may be performed by hardware (e.g., dedicated circuits) in the interface 220, buffer 225, or storage controller 230.

To process a write command received from the host system 205, the memory system controller 215 may first determine if the buffer 225 has sufficient available space to store the data associated with the command. For example, the memory system controller 215 may determine, e.g., via firmware (e.g., controller firmware), an amount of space within the buffer 225 that may be available to store data associated with the write command.

In some cases, a buffer queue 265 may be used to control a flow of commands associated with data stored in the buffer 225, including write commands. The buffer queue 265 may include the access commands associated with data currently stored in the buffer 225. In some cases, the commands in the command queue 260 may be moved to the buffer queue 265 by the memory system controller 215 and may remain in the buffer queue 265 while the associated data is stored in the buffer 225. In some cases, each command in the buffer queue 265 may be associated with an address at the buffer 225. That is, pointers may be maintained that indicate where in the buffer 225 the data associated with each command is stored. Using the buffer queue 265, multiple access commands may be received sequentially from the host system 205 and at least portions of the access commands may be processed concurrently.

If the buffer 225 has sufficient space to store the write data, the memory system controller 215 may cause the interface 220 to transmit an indication of availability to the host system 205 (e.g., a "ready to transfer" indication), e.g., according to a protocol (e.g., a UFS protocol or an eMMC protocol). As the interface 220 subsequently receives from the host system 205 the data associated with the write command, the interface 220 may transfer the data to the buffer 225 for temporary storage using the data path 250. In some cases, the interface 220 may obtain from the buffer 225 or buffer queue 265 the location within the buffer 225 to store the data. The interface 220 may indicate to the memory system controller 215, e.g., via the bus 235, if the data transfer to the buffer 225 has been completed.

Once the write data has been stored in the buffer 225 by the interface 220, the data may be transferred out of the buffer 225 and stored in a memory device 240. This may be done using the storage controller 230. For example, the memory system controller 215 may cause the storage controller 230 to retrieve the data out of the buffer 225 using the data path 250 and transfer the data to a memory device 240. The storage controller 230 may be considered a back end of the memory system 210. The storage controller 230 may indicate to the memory system controller 215, e.g., via the bus 235, that the data transfer to a memory device of the memory devices 240 has been completed.

In some cases, a storage queue 270 may be used to aid with the transfer of write data. For example, the memory system controller 215 may push (e.g., via the bus 235) write commands from the buffer queue 265 to the storage queue 270 for processing. The storage queue 270 may include entries for each access command. In some examples, the storage queue 270 may additionally include a buffer pointer (e.g., an address) that may indicate where in the buffer 225 the data associated with the command is stored and a storage pointer (e.g., an address) that may indicate the location in the memory devices 240 associated with the data. In some cases, the storage controller 230 may obtain from the buffer 225, buffer queue 265, or storage queue 270 the location within the buffer 225 from which to obtain the data. The storage controller 230 may manage the locations within the memory devices 240 to store the data (e.g., performing wear-leveling, garbage collection, and the like). The entries may be added to the storage queue 270, e.g., by the memory system controller 215. The entries may be removed from the storage queue 270, e.g., by the storage controller 230 or memory system controller 215 upon completion of the transfer of the data.

To process a read command received from the host system 205, the memory system controller 215 may again first determine if the buffer 225 has sufficient available space to store the data associated with the command. For example, the memory system controller 215 may determine, e.g., via firmware (e.g., controller firmware), an amount of space within the buffer 225 that may be available to store data associated with the read command.

In some cases, the buffer queue 265 may be used to aid with buffer storage of data associated with read commands in a similar manner as discussed above with respect to write commands. For example, if the buffer 225 has sufficient space to store the read data, the memory system controller 215 may cause the storage controller 230 to retrieve the data associated with the read command from a memory device 240 and store the data in the buffer 225 for temporary storage using the data path 250. The storage controller 230 may indicate to the memory system controller 215, e.g., via the bus 235, when the data transfer to the buffer 225 has been completed.

In some cases, the storage queue 270 may be used to aid with the transfer of read data. For example, the memory system controller 215 may push the read command to the storage queue 270 for processing. In some cases, the storage controller 230 may obtain from the buffer 225 or storage queue 270 the location within the memory devices 240 from which to retrieve the data. In some cases, the storage controller 230 may obtain from the buffer queue 265 the location within the buffer 225 to store the data. In some cases, the storage controller 230 may obtain from the storage queue 270 the location within the buffer 225 to store the data. In some cases, the memory system controller 215 may move the command processed by the storage queue 270 back to the command queue 260.

Once the data has been stored in the buffer 225 by the storage controller 230, the data may be transferred out of the buffer 225 and sent to the host system 205. For example, the memory system controller 215 may cause the interface 220 to retrieve the data out of the buffer 225 using the data path 250 and transmit the data to the host system 205, e.g., according to a protocol (e.g., a UFS protocol or an eMMC protocol). For example, the interface 220 may process the command from the command queue 260 and may indicate to the memory system controller 215, e.g., via the bus 235, that the data transmission to the host system 205 has been completed.

The memory system controller 215 may execute received commands according to an order (e.g., a first-in, first-out order, according to the order of the command queue 260). For each command, the memory system controller 215 may cause data corresponding to the command to be moved into and out of the buffer 225, as discussed above. As the data is moved into and stored within the buffer 225, the command may remain in the buffer queue 265. A command may be removed from the buffer queue 265, e.g., by the memory system controller 215, if the processing of the command has been completed (e.g., if data corresponding to the access command has been transferred out of the buffer 225). If a command is removed from the buffer queue 265, the address previously storing the data associated with that command may be available to store data associated with a new command.

The memory system controller 215 may additionally be configured for operations associated with the memory devices 240. For example, the memory system controller 215 may execute or manage operations such as wear-leveling, operations, garbage collection operations, error control operations such as error-detecting operations or error-correcting operations, encryption operations, caching operations, media management operations, background refresh, health monitoring, and address translations between logical addresses (e.g., LBAs) associated with commands from the host system 205 and physical addresses (e.g., physical block addresses) associated with memory cells within the memory devices 240. That is, the host system 205 may issue commands indicating one or more LBAs and the memory system controller 215 may identify one or more physical block addresses indicated by the LBAs. In some cases, one or more contiguous LBAs may correspond to noncontiguous physical block addresses. In some cases, the storage controller 230 may be configured to perform one or more of the above operations in conjunction with or instead of the memory system controller 215. In some cases, the memory system controller 215 may perform the functions of the storage controller 230 and the storage controller 230 may be omitted.

In some examples, the memory system 210 may be configured to operate in a power saving mode or a sleep mode (e.g., a hibernate mode). As described herein, the power saving mode may utilize more power than the sleep mode, but the memory system 210 may be able to transition from the power saving mode to a normal mode (e.g., an active mode) faster than from the sleep mode to the active mode. The memory system 210 may set an initial duration (e.g., a first duration, Tpsm) for operating in the power saving mode. Accordingly, when the memory system controller 215 receives a command (e.g., a hibernate command) from the host system 205, or when the memory system controller 215 fails to receive a command for a duration (e.g., when the host system 205 is idle), the memory system 210 may enter the power saving mode.

Upon entering the power saving mode, the memory system controller 215 may determine a duration (e.g., a second duration, Tperiod) between received commands. For example, the memory system controller 215 may receive a first command, may transition to the power saving mode, and may receive a second command. The memory system controller 215 may determine the duration between the first command and the second command, which may be referred to as Tperiod. In some instances, the memory system controller 215 may compare Tperiod to a first threshold (e.g., TH_low) and may increase Tpsm if Tperiod does not satisfy the threshold (e.g., if Tperiod<TH_low). Moreover, the memory system controller 215 may compare Tperiod to a second threshold (e.g., TH_high) and may decrease Tpsm if Tperiod satisfies the threshold (e.g., if Tperiod>TH_high).

Accordingly, if no commands are received within Tpsm, the memory system 210 may transition from the power saving mode to the sleep mode. By increasing Tpsm when the memory system controller 215 is receiving commands from the host system 205 at relatively short intervals, the latency the memory system 210 incurs when transitioning power modes may be improved. That is, because the memory system 210 may transition from a power saving mode to an active mode faster than from a sleep mode to an active mode, latency may be improved by increasing Tpsm under heavy loading conditions. Additionally or alternatively, by decreasing Tpsm when the memory system controller 215 is receiving commands from the host system 205 at relatively long intervals, the memory system 210 may incur additional power savings by transitioning to the sleep mode faster.

Figure 3:
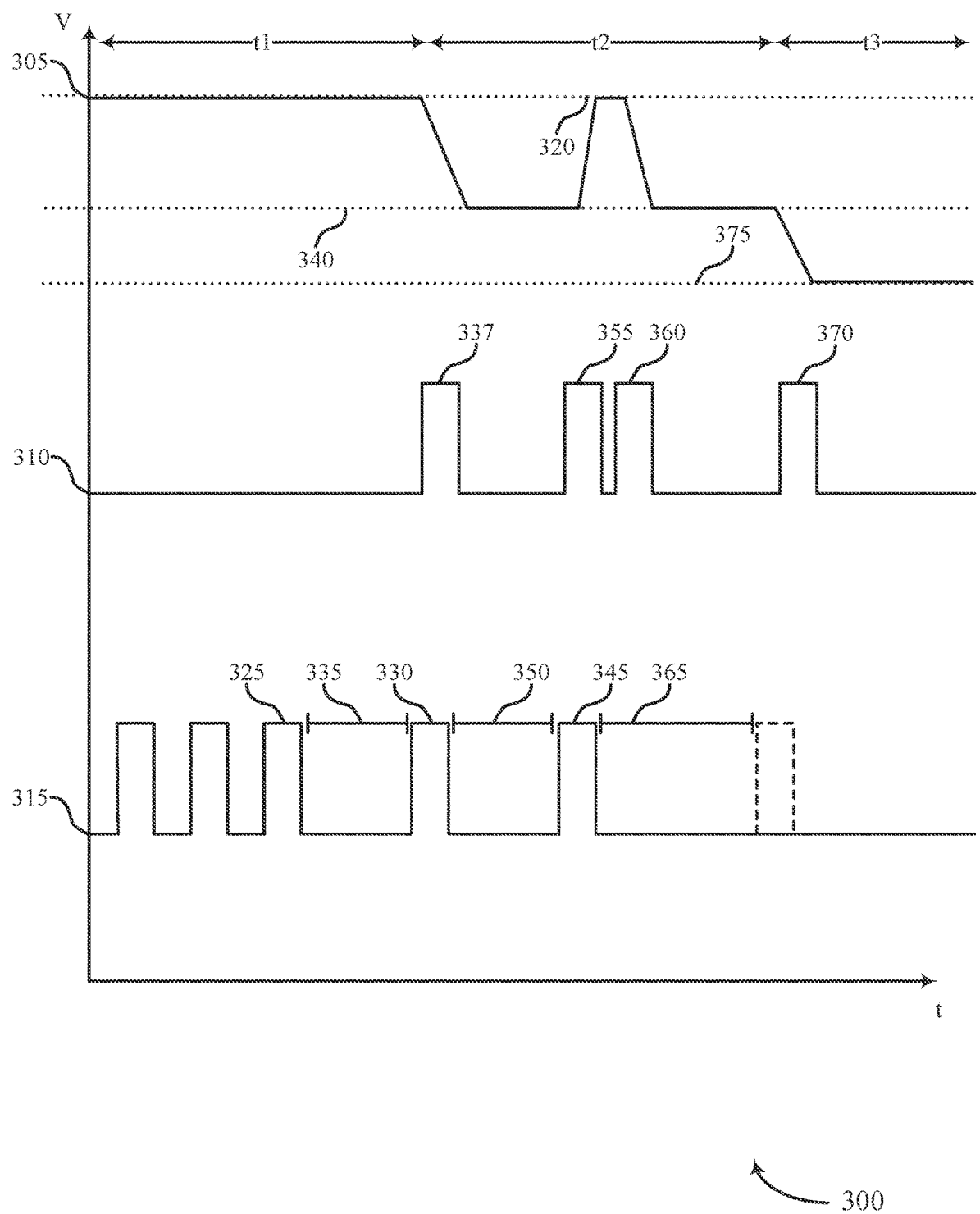
FIG. 3 illustrates an example of a timing diagram that supports dynamic power control in accordance with examples as disclosed herein.

FIG. 3 illustrates an example of a timing diagram 300 that supports dynamic power control in accordance with examples as disclosed herein. The timing diagram 300 may illustrate a power consumption signal 305, a mode signal 310, and command signal 315. The power consumption signal 305 may illustrate the power consumption of a memory device (e.g., a memory system 210 as described with reference to FIG. 2) and the mode signal 310 may illustrate a signal being communicated from a memory controller (e.g., a memory system controller 215 as described with reference to FIG. 2) for the memory system to transition power modes. Moreover, the command signal 315 may illustrate commands being transmitted from a host device (e.g., a host system 205 as described with reference to FIG. 2) to the memory device.

As described herein, the memory device may be configured to dynamically adjust a duration (e.g., Tpsm) for transitioning power modes. By dynamically adjusting the duration for transitioning from a power saving mode to a sleep mode, the memory device may remain in a power saving mode when receiving commands at relatively short intervals, which may reduce the latency that would otherwise be incurred due to the memory device transitioning to the sleep mode. Moreover, the memory device may be configured to transition to the sleep mode when receiving commands at relatively long intervals, which may decrease the overall power consumption of the memory device.

During t1, a memory device may operate in a first power mode (e.g., a normal mode, an active mode). While operating in the first power mode, the memory device may not incur any power savings relative to a second power mode (e.g., a power saving mode) or a third power mode (e.g., a sleep mode, a hibernate mode). That is, all or most components of the memory device may be powered in the first power mode and the power consumption of the memory device may be at or near a first power level 320. Moreover, the memory device may receive commands from a host device at intervals that do not result in the memory device entering a second power mode. For example, the duration between at least some commands received during t1 may not satisfy a threshold duration that would otherwise result in the memory device transitioning from the first power mode to the second power mode. In some examples, the memory device may receive a first command 325 during t1, which may be represented by the command signal 315 going high.

During t2, the memory device may receive a second command 330, which may be represented by the command signal 315 going high. In some instances, the duration 335 between the first command 325 and the second command 330 may satisfy a threshold duration for transitioning the memory device from the first power mode to the second power mode. The duration 335 may be referred to as Tperiod, and may represent the duration between a presently received command and a previously received command. For example, the first command 325 may be received at a first time (e.g., T_old) and the second command 330 may be received at a second time (e.g., T_new), Tperiod may be calculated based on the difference between T_new and T_old (e.g., T_new−T_old).

In some instances, the duration 335 may satisfy a threshold duration for the memory device to transition into a second power mode (e.g., a power saving mode). The memory device may transition to the second power mode based on a signal 337 (e.g., a signal 337 that corresponds to the command 330) that is represented by the mode signal 310 going high. The signal 337 may be communicated from a memory controller (e.g., a memory system controller 215 as described with reference to FIG. 2) being transmitted to various components of the memory device. While operating in the second power mode, the memory device may incur some power savings relative to the first power mode. That is, fewer components may be powered while the memory system operates in the second power mode, thus the power consumption of the memory device may be at or near a second power level 340.

When operating in the second power mode, the memory device may set an initial duration (e.g., a first duration, Tpsm) for transitioning to a third power mode. For example, if a command is received within Tpsm, the memory device may adjust Tpsm based on Tperiod. That is, if Tperiod is less than a first threshold or greater than a second threshold, Tpsm may be adjusted accordingly. However, if no commands are received within Tpsm, then the memory device may transition to a third power mode. As shown in FIG. 3, during t2 the memory device may receive a third command 345 that is represented by the command signal 315 going high, and the third command may be received within Tpsm.

In some examples, the duration 350 (e.g., Tperiod) between the second command 330 and the third command 345 may be compared with the first threshold value and the second threshold value to determine whether Tpsm should be adjusted. Regardless of whether Tpsm is adjusted, the memory device may exit the second power mode and enter (e.g., re-enter) the first power mode to process the third command 345. Accordingly, a signal 355 (e.g., corresponding to the command 345) may be issued, which may be represented by the mode signal 310 going high, and the power consumption of the memory device may be at or near the first power level 320. The latency associated with the memory device transitioning from the second power state to the first power state may be relatively low. After processing the third command 345, the device may enter (e.g., re-enter) the second power mode based on a signal 360, which may be represented by the mode signal 310 going high. The power consumption of the memory device may return to the second power level 340 for the duration of t2.

During t3, the memory device may not receive a command. That is, after receiving the third command 345, the memory device may not receive a command for at least a duration 365 (e.g., Tperiod) that exceeds Tpsm. In some instances, the absence of a command for the duration 365 may result in the memory device transitioning from the second power mode (e.g., the power saving mode) to the third power mode (e.g., a sleep mode, a hibernate mode). The memory device may transition to the third power mode based on a signal 370 that is represented by the mode signal 310 going high. The signal 370 may be communicated from a memory controller (e.g., a memory system controller 215 as described with reference to FIG. 2) being transmitted to various components of the memory device. While operating in the third power mode, the memory device may incur power savings relative to the first power mode and the second power mode. That is, very few or no components of a memory device may be powered while operating in the third power mode, thus the power consumption of the memory device may be at or near a third power level 375.

Although not illustrated in FIG. 3, the memory device may receive a fourth command after entering the third power mode. To process the fourth command, the memory device may exit the third power mode and enter (e.g., re-enter) the first power mode to process the fourth command. As described herein, the latency associated with the memory device transitioning from the third power mode to the first power mode may be higher than when the memory device transitions from the second power mode to the first power mode. However, the power savings incurred by the memory device while operating in the third power mode may be greater than when operating in the second power mode. Accordingly, dynamically adjusting Tpsm may allow for the memory device to optimize both latency and power savings.

Figure 4:
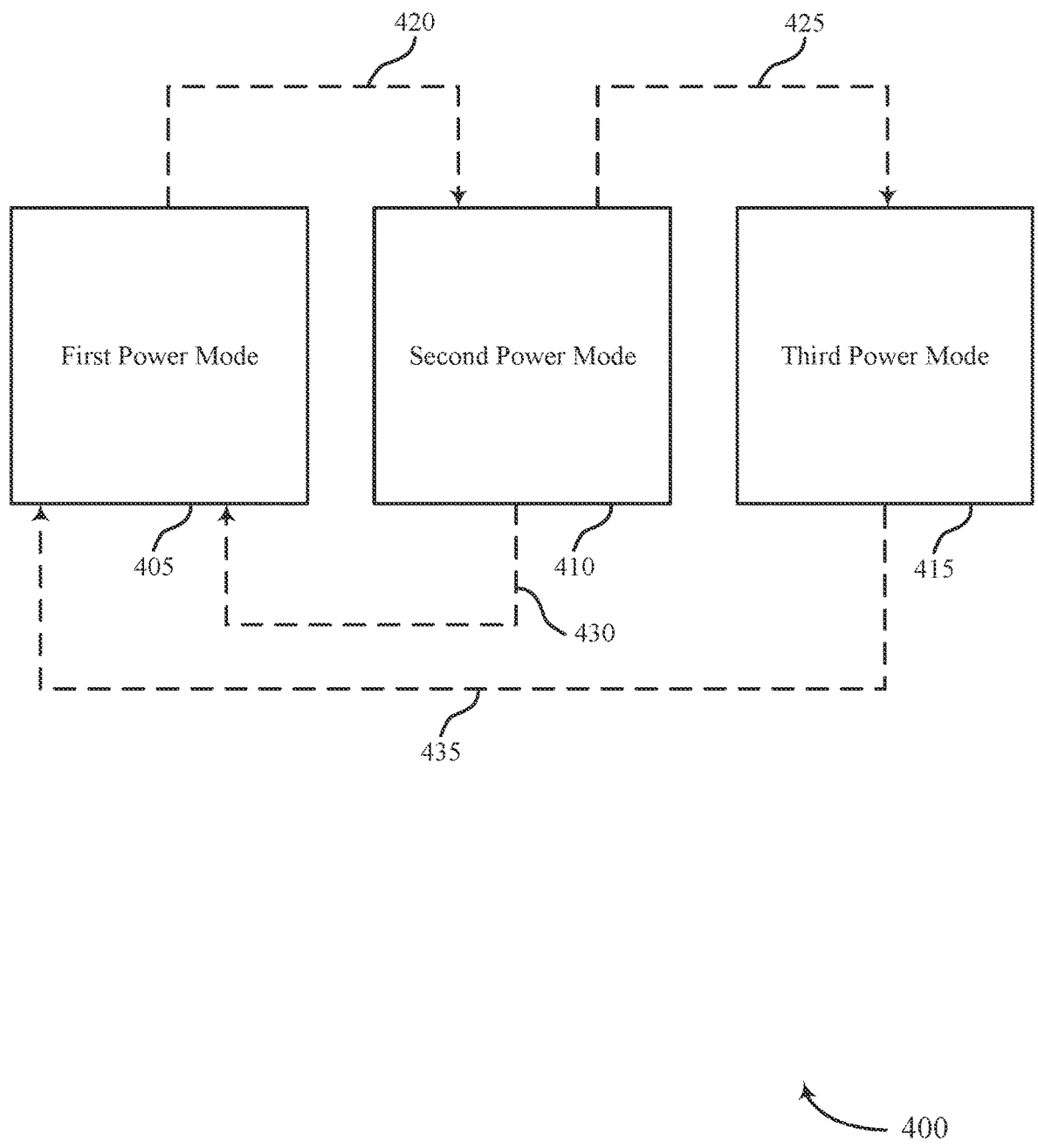
FIG. 4 illustrates an example of a block diagram that supports dynamic power control in accordance with examples as disclosed herein.

FIG. 4 illustrates an example of a block diagram 400 that supports dynamic power control in accordance with examples as disclosed herein. The block diagram may illustrate a first power mode 405, a second power mode 410, and a third power mode 415 of a memory device. As described herein, the memory device may be configured to dynamically adjust a duration (e.g., Tpsm) for transitioning power modes. By dynamically adjusting the duration for transitioning from a second power mode 410 to a third power mode 415, the memory device may remain in a second power mode 410 when receiving commands at relatively short intervals, which may reduce the latency that would otherwise be incurred due to the memory device transitioning to the third power mode 415. Moreover, the memory device may be configured to transition to the third power mode 415 when receiving commands at relatively long intervals, which may decrease the overall power consumption of the memory device.

In some examples, a memory device may operate in a first power mode 405. As described herein, a first power mode 405 may also be referred to as an active mode or a normal power mode. While operating in a first power mode 405, the memory device may process commands (e.g., access commands) received from a host device (e.g., a host system 205 as described with reference to FIG. 2). Moreover, the memory device may consume more power relative to the second power mode 410 and the third power mode 415. That is, most or all components of a memory device may be powered when operating in the first power mode.

In some instances, a memory device may operate in a second power mode 410. As described herein, a second power mode 410 may also be referred to as a power saving mode. While operating in a second power mode 410, at least some components may be powered off. For example, at least a portion of a controller (e.g., a memory system controller 215 as described with reference to FIG. 2), a CPU, a bus (e.g., an ONFI bus), or at least a portion of a memory array may be powered off in the second power mode 410. Some aspects of a memory device, such as a portion of a controller or a portion of a memory array may remain powered so that the memory device can transition from the second power mode 410 to the first power mode relatively quickly. Accordingly, while operating in a second power mode 410, the memory device may consume less power than when operating in the first power mode 405, but more power than when operating in a third power mode 415.

The memory device may also operate in a third power mode 415. As described herein, a third power mode 415 may also be referred to as a sleep mode or a hibernate mode. While operating in a third power mode 415, all or a majority of the components of the memory device may be powered off. For example, while bias voltages or other voltages may still be applied to the memory device, the memory array may not be contacted. That is, at least the controller (e.g., a memory system controller 215 as described with reference to FIG. 2) and memory array may be powered off such that the memory array may not be accessed. Accordingly, while operating in a third power mode 415, the memory device may consume less power than when operating in the first power mode 405 or the second power mode 410.

As described herein, the memory device may transition between power modes. For example, transition 420 may represent a memory device transitioning to operate in a second power mode 410 from a first power mode 405. The transition 420 may occur based on a host device becoming idle (e.g., based on an absence of commands received from the host device for a duration) or based on receiving a command indicating to the memory device to transition power states. Moreover, the transition 425 may represent the memory device transitioning to operate in a third power mode 415 from the second power mode 410. The transition 425 may occur based on the memory device not receiving any commands for a duration (e.g., Tperiod) that is longer than Tpsm. That is, if the host is idle for a duration longer than Tpsm the memory device may transition from the second power mode 410 to the third power mode 415.

Additionally or alternatively, the transition 430 may represent the memory device transitioning to operate in the first power mode 405 from the second power mode 410. The transition 430 may occur based on the memory device receiving a command (e.g., an access command) while operating in the second power mode 410. In some instances, the memory device may transition to the first power mode 405 to process the command, and may then transition back to the second power mode. In other examples, upon receiving a command the memory device may transition from the second power mode 410 to the first power mode 405 until the host becomes idle.

Moreover, the transition 435 may represent the memory device transitioning to operate in the first power mode 405 from the third power mode 415. The transition 435 may occur based on the memory device receiving a command (e.g., an access command) while operating in the third power mode 415. As described herein, the transition 430 may occur faster than the transition 435, however the memory device may incur additional power savings while operating in the third power mode 415. Accordingly, dynamically adjusting Tpsm may result in the memory device optimizing performance and power savings based on the frequency at which commands are received from a host device.

Figure 5A:
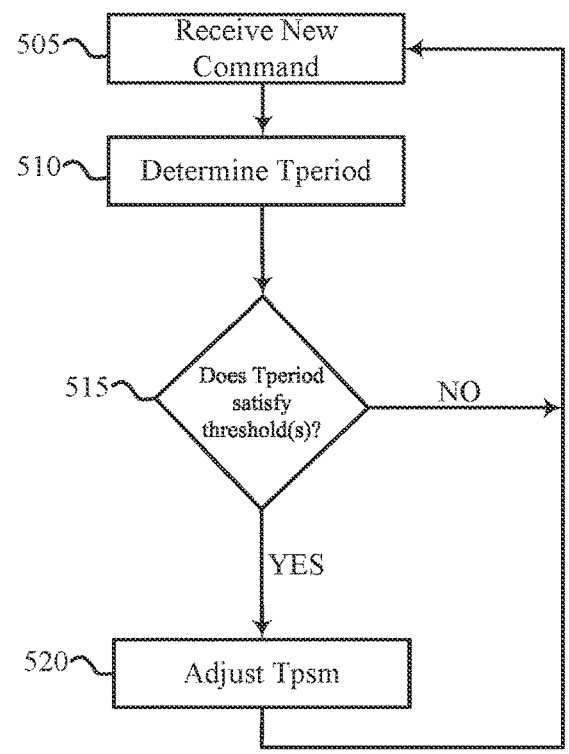
FIG. 5A illustrates an example of a process flow diagram that supports dynamic power control in accordance with examples as disclosed herein.

FIG. 5A illustrates an example of a process flow diagram 500-a that supports dynamic power control in accordance with examples as disclosed herein. In some examples, the process flow diagram 500-a may illustrate various operations performed by a memory device to adjust a duration (e.g., Tpsm) for transitioning from a second power state to a third power state. Aspects of the process flow diagram 500-a may be performed by a controller (e.g., a memory system controller 215 as described with reference to FIG. 2), a comparator (or comparators), or a state machine. Dynamically adjusting Tpsm may result in the memory device optimizing performance and power savings based on the frequency at which commands are received from a host device (e.g., a host system 205 as described with reference to FIG. 2).

At 505, a memory device may receive a command (e.g., a new command, a second command). In some examples, the command may be received from a host device and may be received at a time (e.g., T_new). In some instances, another command (e.g., a first command) may have been received at a time (e.g., T_old) prior to the second command being received.

At 510, the memory device may determine a duration (e.g., Tperiod) between receiving the first command and the second command. In some instances, Tperiod may be calculated using T_new−T_old. As described herein, Tperiod may be used in determining whether to adjust Tpsm.

At 515, the memory device may determine whether Tperiod satisfies one or more threshold values. For example, a first threshold value (e.g., TH_low) and a second threshold (e.g., TH_high) to determine whether to adjust Tpsm. For example, if Tperiod does not satisfy TH_low (e.g., if Tperiod<TH_low), then Tpsm may be increased. Additionally or alternatively, if Tperiod satisfies TH_high (e.g., if Tperiod>TH_high), then Tpsm may be decreased. By way of example, TH_low may be 20 ms and TH_high may be 200 ms, however both TH_low and TH_high are configurable threshold values. In some instances, TH_low and TH_high may be programmed by a host device (e.g., based on a command received from a host device).

In some instances, at 515, Tperiod may satisfy the first threshold and may not satisfy the second threshold. That is, Tperiod may be between TH_low and TH_high (e.g., TH_low<Tperiod<TH_high) and thus Tpsm may not be adjusted (e.g., Tpsm may be maintained at its current duration). In such instances, the memory device may not adjust Tpsm and the process described herein may start over (e.g., the memory device may wait to receive a new command at 505).

If Tperiod does not satisfy TH_low or if Tperiod satisfies TH_high, then Tpsm may be adjusted at 520. In some instances, at 520, Tperiod may be transmitted to a state machine, and the state machine may update Tpsm based on Tperiod. As described herein, dynamically adjusting Tpsm may result in the memory device optimizing performance and power savings based on the frequency at which commands are received from a host device.

Figure 5B:
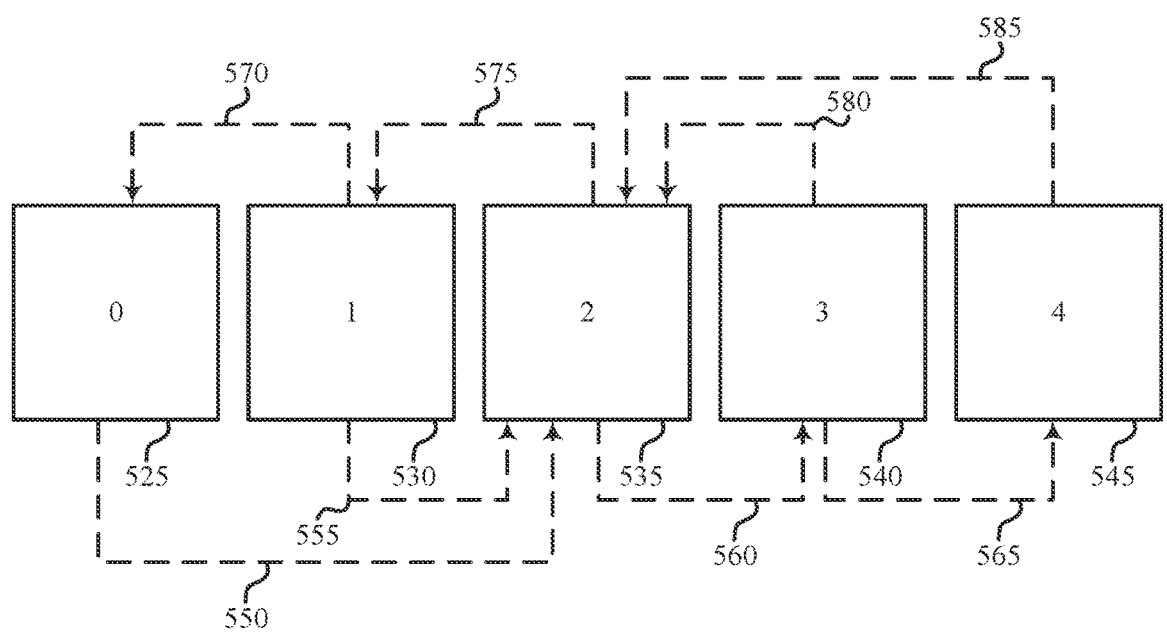
FIG. 5B illustrates an example of a block diagram that supports dynamic power control in accordance with examples as disclosed herein

FIG. 5B illustrates an example of a block diagram 500-*b* that supports dynamic power control in accordance with examples as disclosed herein. In some examples, the block diagram 500-*b* may represent different states, managed by a state machine, that correspond to varying durations for Tpsm. For example, the block diagram 500-1) may illustrate state 0 525, state 1 530, state 2 535, state 3 540, and state 4 545. In some instances, each state may be associated with a different Tpsm, and the state may be selected (or changed) based on comparing Tperiod to a first threshold value (e.g., TH_low) and a second threshold value (e.g., TH_high). Although five states are illustrated and described herein, a memory device may include any quantity of states, and each state may be associated with a respective Tpsm value that may be configurable.

In some instances, a memory device may be initially configured to operate in state 2 535. For example, state 2 535 may be associated with an intermediate Tpsm value (e.g., a Tpsm value that is between PSM_high and PSM_low. PSM_high may be associated with a maximum Tpsm duration that corresponds to state 4 545, and PSM_low may be associated with a minimum Tpsm duration that corresponds to state 0 525. For exemplary purposes only, PSM_high may be 110 ms and PSM_low may be 10 ms. Additionally or alternatively, state 1 530, state 2 535, and state 3 540 may be associated with Tpsm values that are between PSM_high and PSM_low.

As described above with reference to FIG. 5A, when a command is received from a host device, the memory device may calculate Tperiod. The memory device may then compare Tperiod to TH_low and TH_high. If Tperiod does not satisfy the first threshold (e.g., if Tperiod<TH_low), then a state machine or other component of a memory device may increase Tpsm. For example, the transition 550 from state 0 525 to state 1 530 may occur when state 0 525 is enabled and the memory device receives a command where Tperiod<TH_low. Similarly, the transitions 555, 560, and 565 may occur when a respective state is enabled and the memory device receives a command where Tperiod<TH_low. In some instances, the Tpsm may not be increased past a value associated with state 4 545 (e.g., Tpsm may not be increased past PSM_high).

Additionally or alternatively, when a command is received from a host device, the memory device may calculate Tperiod and compare Tperiod to TH_high. If Tperiod satisfies the second threshold (e.g., if Tperiod>TH_low), then a state machine or other component of a memory device may decrease Tpsm. For example, the transition 585 from state 4 545 to state 3 540 may occur when state 4 545 is enabled and the memory device receives a command where Tperiod>TH_high. Similarly, the transitions 580, 575, and 570 may occur when a respective state is enabled and the memory device receives a command where Tperiod>TH_high. In some instances, the Tpsm may not be decreased past a value associated with state 0 525 (e.g., Tpsm may not be decreased below PSM_low).

In some instances, the memory device may use more than one duration (e.g., more than one Tperiod) before transitioning states. That is, the memory device may transition states based on a finite quantity Tperiods failing to satisfy the first threshold value or satisfying the second threshold value. The quantity of Tperiods for transitioning states may be programmable, and may be set as a matter of design choice. For example, the quantity of Tperiods for transitioning states may be three (3), such that three consecutive Tperiods (or three Tperiods within a fixed duration) must either fail to satisfy the first threshold value or satisfy the second threshold value before a state transition occurs. Regardless of whether a finite quantity of Tperiods is required before a state transition occurs, dynamically adjusting Tpsm may result in the memory device optimizing performance and power savings based on the frequency at which commands are received from a host device.

Figure 6:
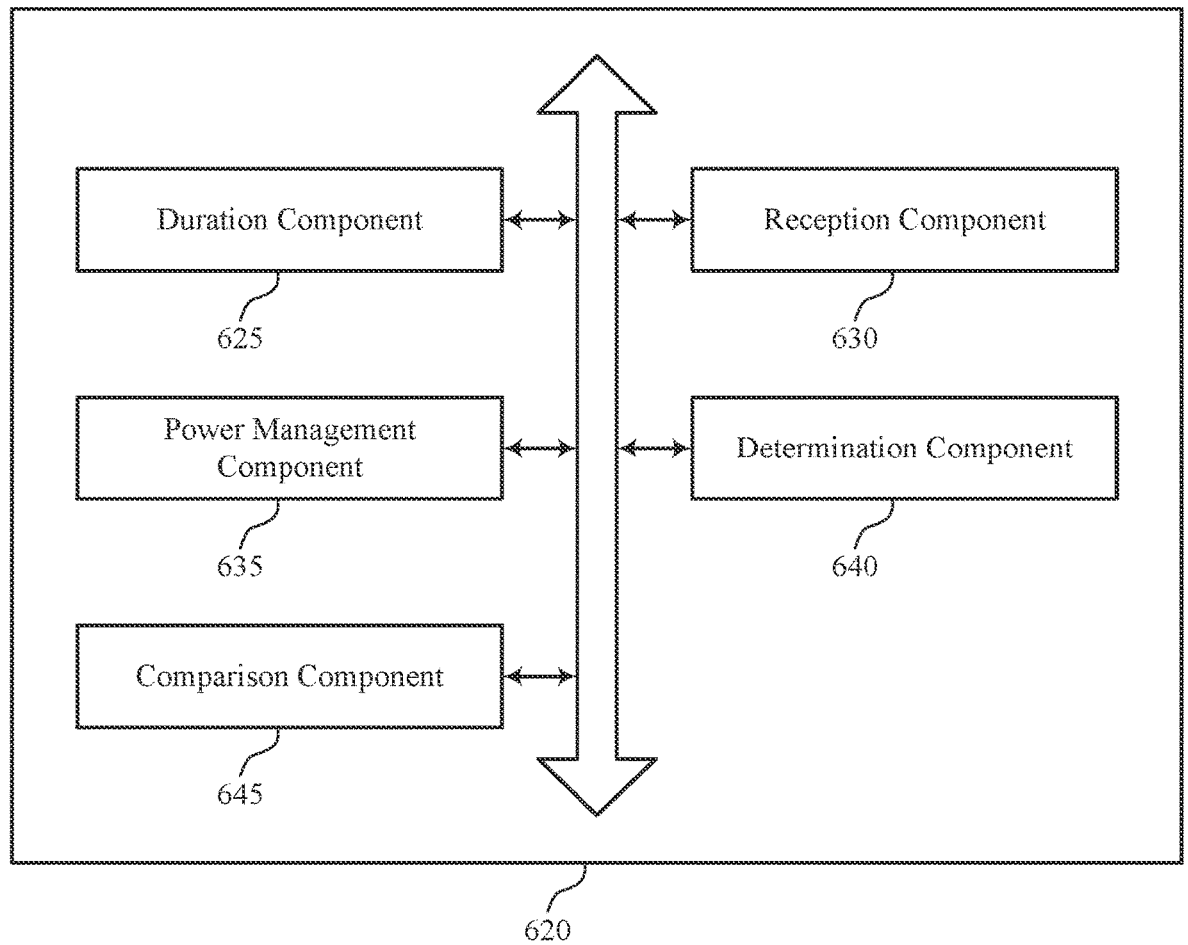
FIG. 6 shows a block diagram of a memory device that supports dynamic power control in accordance with examples as disclosed herein.

FIG. 6 shows a block diagram 600 of a memory device 620 that supports dynamic power control in accordance with examples as disclosed herein. The memory device 620 may be an example of aspects of a memory device as described with reference to FIGS. 1 through 5. The memory device 620, or various components thereof, may be an example of means for performing various aspects of dynamic power control as described herein. For example, the memory device 620 may include a duration component 625, a reception component 630, a power management component 635, a determination component 640, a comparison component 645, or any combination thereof. Each of these components may communicate, directly or indirectly, with one another (e.g., via one or more buses).

The duration component 625 may be configured as or otherwise support a means for setting, at a memory device including a plurality of memory cells, a first duration for operating the memory device in a second power mode that is different than a first power mode. In some examples, the duration component 625 may be configured as or otherwise support a means for adjusting the first duration for operating the memory device in the second power mode based at least in part on a second duration between receiving the first command and the second command.

In some examples, the duration component 625 may be configured as or otherwise support a means for increasing the first duration based at least in part on determining that the second duration does not satisfy the first threshold. In some examples, the duration component 625 may be configured as or otherwise support a means for decreasing the first duration based at least in part on determining that the second duration satisfies the second threshold. In some examples, the duration component 625 may be configured as or otherwise support a means for maintaining the first duration based at least in part on determining that the second duration satisfies the first threshold and does not satisfy the second threshold.

The reception component 630 may be configured as or otherwise support a means for receiving, from a host device, a first command and a second command after setting the first duration for operating the memory device in the second power mode, where at least the second command is received after a transition of the memory device from the first power mode to the second power mode. In some examples, the reception component 630 may be configured as or otherwise support a means for receiving, from the host device, a sixth command, where the sixth command is configured to adjust the first threshold, the second threshold, or both.

The power management component 635 may be configured as or otherwise support a means for operating, after receiving a third command while operating in the first power mode, the memory device in the second power mode for the adjusted first duration based at least in part on adjusting the first duration. In some examples, the power management component 635 may be configured as or otherwise support a means for operating the memory device in a third power mode after operating the memory device in the second power mode for the adjusted first duration based at least in part on an absence of commands received after the third command and for the adjusted first duration.

In some examples, to support adjusting the first duration for operating the memory device in the second power mode, the determination component 640 may be configured as or otherwise support a means for determining the second duration as corresponding to a time between receiving the first command and the second command. In some examples, the determination component 640 may be configured as or otherwise support a means for determining a third duration as corresponding to a time between receiving a fourth command and a fifth command, where the memory device transitions to the second power mode after receiving the fourth command, and where the fifth command is received after the transition of the memory device from the first power mode to the second power mode after receiving the fourth command.

In some examples, the determination component 640 may be configured as or otherwise support a means for determining whether the second duration satisfies the first threshold based at least in part on comparing the second duration to the first threshold. In some examples, the determination component 640 may be configured as or otherwise support a means for determining whether the second duration satisfies the second threshold based at least in part on comparing the second duration to the first threshold and the second threshold. In some examples, the determination component 640 may be configured as or otherwise support a means for determining whether the second duration satisfies the first threshold and the second threshold based at least in part on comparing the second duration to the first threshold and the second threshold.

In some examples, to support adjusting the first duration for operating the memory device in the second power mode, the comparison component 645 may be configured as or otherwise support a means for comparing the second duration to a first threshold and a. second threshold, where adjusting the first duration for operating the memory device in the second power mode is based at least in part on comparing the second duration to the first threshold and the second threshold. In some examples, the comparison component 645 may be configured as or otherwise support a means for comparing the third duration to the first threshold and the second threshold, where adjusting the first duration for operating the memory device in the second power mode is based at least in part on comparing the third duration to the first threshold and the second threshold.

In some examples, the second power mode includes a lower power mode than the first power mode and. In some examples, the third power mode includes a lower power mode than the second power mode. In some examples, when operating in the second power mode, the controller remains powered while at least a subset of the plurality of memory cells are unpowered.

Figure 7:
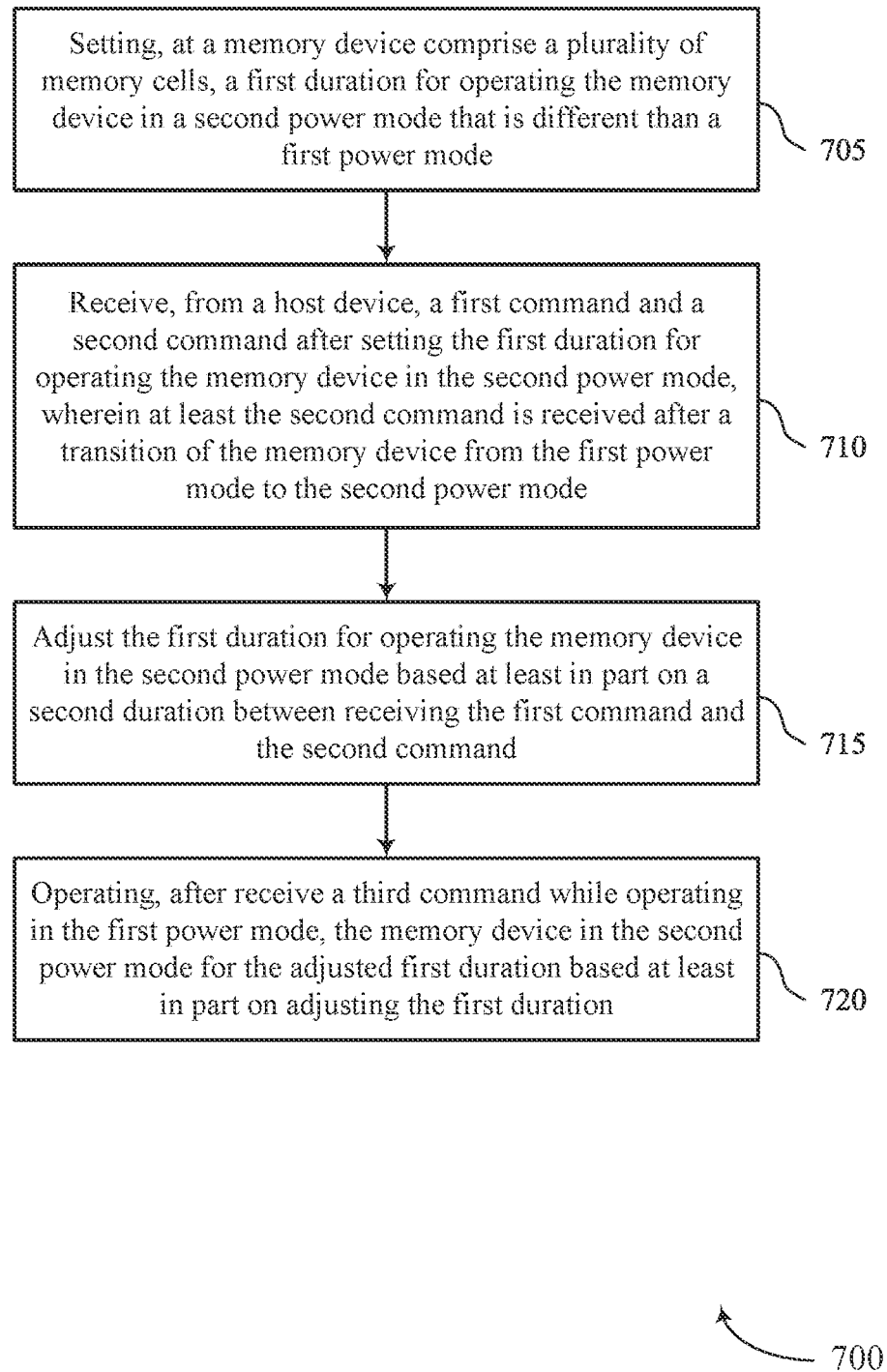
FIG. 7 shows a flowchart illustrating a method or methods that support dynamic power control in accordance with examples as disclosed herein.

FIG. 7 shows a flowchart illustrating a method 700 that supports dynamic power control in accordance with examples as disclosed herein. The operations of method 700 may be implemented by a memory device or its components as described herein. For example, the operations of method 700 may be performed by a memory device as described with reference to FIGS. 1 through 6. In some examples, a memory device may execute a set of instructions to control the functional elements of the device to perform the described functions. Additionally or alternatively, the memory device may perform aspects of the described functions using special-purpose hardware.

At 705, the method may include setting, at a memory device including a plurality of memory cells, a first duration for operating the memory device in a second power mode that is different than a first power mode. The operations of 705 may be performed in accordance with examples as disclosed herein. In some examples, aspects of the operations of 705 may be performed by a duration component 625 as described with reference to FIG. 6.

At 710, the method may include receiving, from a host device, a first command and a second command after setting the first duration for operating the memory device in the second power mode, where at least the second command is received after a transition of the memory device from the first power mode to the second power mode. The operations of 710 may be performed in accordance with examples as disclosed herein. In some examples, aspects of the operations of 710 may be performed by a reception component 630 as described with reference to FIG. 6.

At 715, the method may include adjusting the first duration for operating the memory device in the second power mode based at least in part on a second duration between receiving the first command and the second command. The operations of 715 may be performed in accordance with examples as disclosed herein. In some examples, aspects of the operations of 715 may be performed by a duration component 625 as described with reference to FIG. 6.

At 720, the method may include operating, after receiving a third command while operating in the first power mode, the memory device in the second power mode for the adjusted first duration based at least in part on adjusting the first duration. The operations of 720 may be performed in accordance with examples as disclosed herein. In some examples, aspects of the operations of 720 may be performed by a power management component 635 as described with reference to FIG. 6.

In some examples, an apparatus as described herein may perform a method or methods, such as the method 700. The apparatus may include, features, circuitry, logic, means, or instructions (e.g., a non-transitory computer-readable medium storing instructions executable by a processor) for setting, at a memory device including a plurality of memory cells, a first duration for operating the memory device in a second power mode that is different than a first power mode, receiving, from a host device, a first command and a second command after setting the first duration for operating the memory device in the second power mode, where at least the second command is received after a transition of the memory device from the first power mode to the second power mode, adjusting the first duration for operating the memory device in the second power mode based at least in part on a second duration between receiving the first command and the second command, and operating, after receiving a third command while operating in the first power mode, the memory device in the second power mode for the adjusted first duration based at least in part on adjusting the first duration.

Some examples of the method 700 and the apparatus described herein may further include operations, features, circuitry, logic, means, or instructions for operating the memory device in a third power mode after operating the memory device in the second power mode for the adjusted first duration based at least in part on an absence of commands received after the third command and for the adjusted first duration.

In some examples of the method 700 and the apparatus described herein, the second power mode includes a lower power mode than the first power mode and the third power mode includes a lower power mode than the second power mode.

In some examples of the method 700 and the apparatus described herein, adjusting the first duration for operating the memory device in the second power mode may include operations, features, circuitry, logic, means, or instructions for determining the second duration as corresponding to a time between receiving the first command and the second command and comparing the second duration to a first threshold and a second threshold, where adjusting the first duration for operating the memory device in the second power mode may be based at least in part on comparing the second duration to the first threshold and the second threshold.

Some examples of the method 700 and the apparatus described herein may further include operations, features, circuitry, logic, means, or instructions for determining a third duration as corresponding to a time between receiving a fourth command and a fifth command, where the memory device transitions to the second power mode after receiving the fourth command, and where the fifth command may be received after the transition of the memory device from the first power mode to the second power mode after receiving the fourth command and comparing the third duration to the first threshold and the second threshold, where adjusting the first duration for operating the memory device in the second power mode may be based at least in part on comparing the third duration to the first threshold and the second threshold.

Some examples of the method 700 and the apparatus described herein may further include operations, features, circuitry, logic, means, or instructions for determining whether the second duration satisfies the first threshold based at least in part on comparing the second duration to the first threshold and increasing the first duration based at least in part on determining that the second duration does not satisfy the first threshold.

Some examples of the method 700 and the apparatus described herein may further include operations, features, circuitry, logic, means, or instructions for determining whether the second duration satisfies the second threshold based at least in part on comparing the second duration to the first threshold and the second threshold and decreasing the first duration based at least in part on determining that the second duration satisfies the second threshold.

Some examples of the method 700 and the apparatus described herein may further include operations, features, circuitry, logic, means, or instructions for determining whether the second duration satisfies the first threshold and the second threshold based at least in part on comparing the second duration to the first threshold and the second threshold and maintaining the first duration based at least in part on determining that the second duration satisfies the first threshold and does not satisfy the second threshold.

Some examples of the method 700 and the apparatus described herein may further include operations, features, circuitry, logic, means, or instructions for receiving, from the host device, a sixth command, where the sixth command may be configured to adjust the first threshold, the second threshold, or both.

In some examples of the method 700 and the apparatus described herein, when operating in the second power mode, the controller remains powered while at least a subset of the plurality of memory cells may be unpowered.

It should be noted that the methods described above describe possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed and second condition or action may at least partially occur as a result of the previous condition or action occurring (whether directly after or after one or more other intermediate conditions or actions occurring after the first condition or action).

Additionally, the terms "directly in response to" or "in direct response to" may refer to one condition or action occurring as a direct result of a previous condition or action. In some examples, a first condition or action may be performed and second condition or action may occur directly as a result of the previous condition or action occurring independent of whether other conditions or actions occur. In some examples, a first condition or action may be performed and second condition or action may occur directly as a result of the previous condition or action occurring, such that no other intermediate conditions or actions occur between the earlier condition or action and the second condition or action or a limited quantity of one or more intermediate steps or actions occur between the earlier condition or action and the second condition or action. Any condition or action described herein as being performed "based on," "based at least in part on," or "in response to" some other step, action, event, or condition may additionally or alternatively (e.g., in an alternative example) be performed "in direct response to" or "directly in response to" such other condition or action unless otherwise specified.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus, comprising:
a plurality of memory cells; and
a controller coupled with the plurality of memory cells and operable to:
set a first duration for operating the apparatus in a second power mode that is different than a first power mode;
receive, from a host device, a first command and a second command after setting the first duration for operating the apparatus in the second power mode, wherein at least the second command is received after a transition of the apparatus from the first power mode to the second power mode;
adjust the first duration for operating the apparatus in the second power mode based at least in part on a second duration between receiving the first command and the second command; and
operate, after receiving a third command while operating in the first power mode, the apparatus in the second power mode for the adjusted first duration based at least in part on adjusting the first duration.

2. The apparatus of claim 1, wherein the controller is operable to:
operate the apparatus in a third power mode after operating the apparatus in the second power mode for the adjusted first duration based at least in part on an absence of commands received after the third command and for the adjusted first duration.

3. The apparatus of claim 2, wherein the second power mode comprises a lower power mode than the first power mode, and wherein the third power mode comprises a lower power mode than the second power mode.

4. The apparatus of claim 1, wherein the controller is operable to adjust the first duration for operating the apparatus in the second power mode by:
determining the second duration as corresponding to a time between receiving the first command and the second command; and
comparing the second duration to a first threshold and a second threshold, wherein adjusting the first duration for operating the apparatus in the second power mode is based at least in part on comparing the second duration to the first threshold and the second threshold.

5. The apparatus of claim 4, wherein the controller is operable to:
determine a third duration as corresponding to a time between receiving a fourth command and a fifth command, wherein the apparatus transitions to the second power mode after receiving the fourth command, and wherein the fifth command is received after the transition of the apparatus from the first power mode to the second power mode after receiving the fourth command; and
compare the third duration to the first threshold and the second threshold, wherein adjusting the first duration for operating the apparatus in the second power mode is based at least in part on comparing the third duration to the first threshold and the second threshold.

6. The apparatus of claim 4, wherein the controller is operable to:
determine whether the second duration satisfies the first threshold based at least in part on comparing the second duration to the first threshold; and
increase the first duration based at least in part on determining that the second duration does not satisfy the first threshold.

7. The apparatus of claim 4, wherein the controller is operable to:
  determine whether the second duration satisfies the second threshold based at least in part on comparing the second duration to the first threshold and the second threshold; and
  decrease the first duration based at least in part on determining that the second duration satisfies the second threshold.

8. The apparatus of claim 4, wherein the controller is operable to:
  determine whether the second duration satisfies the first threshold and the second threshold based at least in part on comparing the second duration to the first threshold and the second threshold; and
  maintain the first duration based at least in part on determining that the second duration satisfies the first threshold and does not satisfy the second threshold.

9. The apparatus of claim 4, wherein the controller is operable to:
  receive, from the host device, a sixth command, wherein the sixth command is configured to adjust the first threshold, the second threshold, or both.

10. The apparatus of claim 1, wherein, when operating in the second power mode, the controller remains powered while at least a subset of the plurality of memory cells are unpowered.

11. A non-transitory computer-readable medium storing code comprising instructions which, when executed by a processor of a memory device, cause the memory device to:
  set, at the memory device comprising a plurality of memory cells, a first duration for operating the memory device in a second power mode that is different than a first power mode;
  receive, from a host device, a first command and a second command after setting the first duration for operating the memory device in the second power mode, wherein at least the second command is received after a transition of the memory device from the first power mode to the second power mode;
  adjust the first duration for operating the memory device in the second power mode based at least in part on a second duration between receiving the first command and the second command; and
  operate, after receiving a third command while operating in the first power mode, in the second power mode for the adjusted first duration based at least in part on adjusting the first duration.

12. The non-transitory computer-readable medium of claim 11, wherein the instructions, when executed by the processor of the memory device, further cause the memory device to:
  operate in a third power mode after operating in the second power mode for the adjusted first duration based at least in part on an absence of commands received after the third command and for the adjusted first duration.

13. The non-transitory computer-readable medium of claim 12, wherein the second power mode comprises a lower power mode than the first power mode and wherein the third power mode comprises a lower power mode than the second power mode.

14. The non-transitory computer-readable medium of claim 11, wherein the instructions, when executed by the processor of the memory device, further cause the memory device to adjust the first duration for operating the memory device in the second power mode by:
  determining the second duration as corresponding to a time between receiving the first command and the second command; and
  comparing the second duration to a first threshold and a second threshold, wherein adjusting the first duration for operating the memory device in the second power mode is based at least in part on comparing the second duration to the first threshold and the second threshold.

15. The non-transitory computer-readable medium of claim 14, wherein the instructions, when executed by the processor of the memory device, further cause the memory device to:
  determine a third duration as corresponding to a time between receiving a fourth command and a fifth command, wherein the memory device transitions to the second power mode after receiving the fourth command, and wherein the fifth command is received after the transition of the memory device from the first power mode to the second power mode after receiving the fourth command; and
  compare the third duration to the first threshold and the second threshold, wherein adjusting the first duration for operating the memory device in the second power mode is based at least in part on comparing the third duration to the first threshold and the second threshold.

16. The non-transitory computer-readable medium of claim 14, wherein the instructions, when executed by the processor of the memory device, further cause the memory device to:
  determine whether the second duration satisfies the first threshold based at least in part on comparing the second duration to the first threshold; and
  increase the first duration based at least in part on determining that the second duration does not satisfy the first threshold.

17. The non-transitory computer-readable medium of claim 14, wherein the instructions, when executed by the processor of the memory device, further cause the memory device to:
  determine whether the second duration satisfies the second threshold based at least in part on comparing the second duration to the first threshold and the second threshold; and
  decrease the first duration based at least in part on determining that the second duration satisfies the second threshold.

18. The non-transitory computer-readable medium of claim 14, wherein the instructions, when executed by the processor of the memory device, further cause the memory device to:
  determine whether the second duration satisfies the first threshold and the second threshold based at least in part on comparing the second duration to the first threshold and the second threshold; and
  maintain the first duration based at least in part on determining that the second duration satisfies the first threshold and does not satisfy the second threshold.

19. The non-transitory computer-readable medium of claim 14, wherein the instructions, when executed by the processor of the memory device, further cause the memory device to:
  receive, from the host device, a sixth command, wherein the sixth command is configured to adjust the first threshold, the second threshold, or both.

20. A method, comprising:
setting, at a memory device comprising a plurality of memory cells, a first duration for operating the memory device in a second power mode that is different than a first power mode;
receiving, from a host device, a first command and a second command after setting the first duration for operating the memory device in the second power mode, wherein at least the second command is received after a transition of the memory device from the first power mode to the second power mode;
adjusting the first duration for operating the memory device in the second power mode based at least in part on a second duration between receiving the first command and the second command; and
operating, after receiving a third command while operating in the first power mode, the memory device in the second power mode for the adjusted first duration based at least in part on adjusting the first duration.

21. The method of claim 20, further comprising:
operating the memory device in a third power mode after operating the memory device in the second power mode for the adjusted first duration based at least in part on an absence of commands received after the third command and for the adjusted first duration.

22. The method of claim 21, wherein the second power mode comprises a lower power mode than the first power mode and wherein the third power mode comprises a lower power mode than the second power mode.

23. The method of claim 20, wherein adjusting the first duration for operating the memory device in the second power mode comprises:
determining the second duration as corresponding to a time between receiving the first command and the second command; and
comparing the second duration to a first threshold and a second threshold, wherein adjusting the first duration for operating the memory device in the second power mode is based at least in part on comparing the second duration to the first threshold and the second threshold.

24. The method of claim 23, further comprising:
determining a third duration as corresponding to a time between receiving a fourth command and a fifth command, wherein the memory device transitions to the second power mode after receiving the fourth command, and wherein the fifth command is received after the transition of the memory device from the first power mode to the second power mode after receiving the fourth command; and
comparing the third duration to the first threshold and the second threshold, wherein adjusting the first duration for operating the memory device in the second power mode is based at least in part on comparing the third duration to the first threshold and the second threshold.

25. The method of claim 23, further comprising:
determining whether the second duration satisfies the first threshold based at least in part on comparing the second duration to the first threshold; and
increasing the first duration based at least in part on determining that the second duration does not satisfy the first threshold.

* * * * *